UNITED STATES PATENT OFFICE.

EDWARD WATSON, OF GRAND RAPIDS, MICHIGAN.

METHOD OF MAKING MATERIAL FOR WALL DECORATION.

SPECIFICATION forming part of Letters Patent No. 522,635, dated July 10, 1894.

Application filed February 9, 1894. Serial No. 499,682. (No specimens.)

*To all whom it may concern:*

Be it known that I, EDWARD WATSON, a citizen of the United States, residing at Grand Rapids, in the county of Kent and State of Michigan, have invented certain new and useful Improvements in Methods of Making Material for Wall Decoration, of which the following is a specification.

In the manufacture of such material the principal pigment which constitutes the body of the compound is usually composed of calcined gypsum, to which may be added any coloring matter or paints, and by some manufacturers sulphate of zinc, alum, &c., may be added. All the various ingredients are thoroughly incorporated and reduced to a fine powder. The adhesive matter is also incorporated in the dry powder, which is then ready for use by simply mixing with water.

My invention relates to that class of compounds in which calcined gypsum is incorporated with glue as the adhesive agent, to which various other substances may be added.

In describing my process I shall consider the principal pigment or calcined gypsum as representing the dry matter to be incorporated with the glue, and it is in the matter of the incorporation of the glue with calcined gypsum that my invention is directed.

In making such products different methods are employed to incorporate the glue with the calcined gypsum. By some manufacturers ground glue is mixed with calcined gypsum and reground. By others the glue is first dissolved in hot water and the liquid glue mixed with calcined gypsum, then dried and ground. The disadvantage of the first method is that hot water must be used for mixing it for use. By the last method that difficulty is obviated, but considerable difficulty arises in the process of manufacture, on account of the very sticky nature of the liquid glue, and in handling the tenacious mass while mixing, and there is great loss of glue by reason of its sticking to the various utensils used in the process, or much time must be consumed in removing it therefrom.

By my invention the water is held firmly by absorption in gelatinous glue, and in that form the glue can be freely handled, and quickly removed from one vessel to another without sticking to anything, and the glue can thus be easily and quickly mixed with calcined gypsum, and still the mixture will not be tenacious or sticky to handle. The incorporation of the gelatinous glue with the calcined gypsum may be effected by stirring or sifting the ingredients together, or the compound may be more intimately mixed by grinding or rubbing the cold gelatinous glue and calcined gypsum together.

I desire to call attention to a special advantage my process has over the process of mixing liquid glue with calcined gypsum in making these compounds. It is known to injure the product if the water contained in the liquid glue chemically unites with the calcined gypsum. And to prevent this manufacturers are compelled to make inconvenient haste in the process of drying. By my process, the glue having so great an affinity for water holds it firmly by absorption in the gelatinous glue, and thus the glue and calcined gypsum may be mixed together and allow more time to handle the mixture and to prepare for drying the product.

In practically carrying out my invention, starting out with glue, I prefer dry ground glue, to which I add cold water, and then allow the mixture to rest until the glue swells up, and becomes gelatinous. The quantity of water being from one pint to one quart to each pound of dry glue. I generally add to the water about one pound of lime to every hundred pounds of dry glue, but I do not consider this an essential part of my invention. After the glue has become fully gelatinous by the absorption of water, I then mix it with calcined gypsum in about the proportions (estimating the dry glue) of one to two hundred pounds of dry animal glue to two thousand pounds of calcined gypsum, and after thoroughly incorporating the mixture, it is to be dried by heat, and during the process of drying, the mixture should be stirred occasionally or constantly until dry. In drying this product the temperature should be kept at about 212° Fahrenheit, but with caution it may be somewhat increased to hasten the drying process. After being completely dried, the product is to be subsequently reduced to a very fine powder, when it will be ready for use by simply mixing with water.

In drying the mixture, the heat may be applied by any suitable means, either in an open receptacle or closed until the temperature is raised to about the boiling point, then the water should be allowed to evaporate.

In case it may be desirable to incorporate with this compound any coloring matter or paints, or such agents as sulphate of zinc, alum, &c., they may be added to the finished product, or be introduced at any stage of the process.

In carrying out my invention the exact proportions or steps in the process described may be changed or modified within limits, without departing from the spirit of my invention.

I desire to be distinctly understood as making no claim to any process of first mixing calcined gypsum with liquid glue. In using the term gelatinous glue, I do not intend the term to be construed as in any way meaning liquid glue. I also desire it understood that I make no claim to the use of glue in the condition in which it comes from the rendering tank.

It is to be distinctly understood that to meet the requirements of my invention and claim, the glue must have been previously dried as in the case with dry commercial glue.

I claim—

In manufacturing an adhesive wall coating, the process of incorporating the adhesive matter with calcined gypsum, which consists of the following steps: first, add cold water to dry animal glue, then allow the glue to swell up and become gelatinous by absorption of water, then mix the cold gelatinous glue with calcined gypsum, expel the water by heat, and subsequently reduce the product to a very fine powder, substantially as described.

EDWARD WATSON.

Witnesses:
MARY C. FRALICK,
A. J. SMITH.